United States Patent
Wood et al.

(10) Patent No.: US 9,363,575 B2
(45) Date of Patent: Jun. 7, 2016

(54) METHOD AND APPARATUS FOR VIEWING INSTANT REPLAY

(71) Applicant: Roku, Inc., Saratoga, CA (US)

(72) Inventors: Anthony Wood, Palo Alto, CA (US);
Wim Michels, San Jose, CA (US);
Patrick Ellis, San Jose, CA (US)

(73) Assignee: ROKU, INC., Saratoga, CA (US)

( * ) Notice: Subject to any disclaimer, the term of this patent is extended or adjusted under 35 U.S.C. 154(b) by 0 days.

(21) Appl. No.: 13/778,094

(22) Filed: Feb. 26, 2013

(65) Prior Publication Data

US 2014/0241696 A1  Aug. 28, 2014

(51) Int. Cl.

| | | |
|---|---|---|
| *H04N 5/92* | (2006.01) | |
| *H04N 21/6587* | (2011.01) | |
| *H04N 21/2387* | (2011.01) | |
| *H04N 21/43* | (2011.01) | |
| *H04N 21/488* | (2011.01) | |
| *H04N 5/765* | (2006.01) | |
| *H04N 5/783* | (2006.01) | |
| *H04N 9/82* | (2006.01) | |

(52) U.S. Cl.
CPC ....... *H04N 21/6587* (2013.01); *H04N 21/2387* (2013.01); *H04N 21/4307* (2013.01); *H04N 21/4884* (2013.01); *H04N 5/765* (2013.01); *H04N 5/783* (2013.01); *H04N 9/8233* (2013.01)

(58) Field of Classification Search
CPC ............ H04H 20/38; H04N 21/42615; H04N 21/4307; H04N 21/4884; H04N 21/2387; H04N 21/6587; H04N 9/8233
USPC .................. 386/244, 248, 353; 725/139, 100
See application file for complete search history.

(56) References Cited

U.S. PATENT DOCUMENTS

| | | | | |
|---|---|---|---|---|
| 5,987,214 | A * | 11/1999 | Iwamura | H04N 7/0885 348/468 |
| 6,289,165 | B1 * | 9/2001 | Abecassis | G11B 19/02 348/E5.105 |
| 6,424,097 | B1 * | 7/2002 | Pruett et al. | 315/219 |
| 6,463,486 | B1 * | 10/2002 | Parry | G11B 20/10 348/E5.002 |
| 7,095,947 | B2 * | 8/2006 | van der Schaar | 386/201 |
| 7,489,851 | B2 * | 2/2009 | Ryu | 386/343 |
| 7,593,060 | B2 * | 9/2009 | Yoo et al. | 348/468 |

(Continued)

FOREIGN PATENT DOCUMENTS

| | | | |
|---|---|---|---|
| CN | 1859565 A | * | 11/2006 |
| WO | WO 02/89134 | * | 7/2002 |

OTHER PUBLICATIONS

Wang et al, Machine generated translation of CN1859565A, Nov. 2006.*

*Primary Examiner* — David Harvey
(74) *Attorney, Agent, or Firm* — Sterne, Kessler, Goldstein & Fox P.L.L.C.

(57) ABSTRACT

A system includes a client device configured to detect an initial play request for a portion of a video stream and detect a subsequent play request for the portion of the video stream. A content server coupled to the client device is configured to transmit the portion of the video stream to the client device based upon the initial play request. A closed captioning information server coupled to the client device is configured to transmit the closed captioning information to the client device based on the initial play request. The client device is configured to display the portion of the video stream and the closed captioning information based upon the subsequent play request.

14 Claims, 6 Drawing Sheets

(56) References Cited

U.S. PATENT DOCUMENTS

| | | | |
|---|---|---|---|
| 7,734,148 B2 * | 6/2010 | Lee | 386/244 |
| 7,826,714 B2 * | 11/2010 | Berstis et al. | 386/241 |
| 7,836,404 B2 * | 11/2010 | Dietz et al. | 715/748 |
| 8,218,560 B2 * | 7/2012 | Fujinami et al. | 370/412 |
| 2002/0056082 A1 | 5/2002 | Hull et al. | 725/1 |
| 2003/0219234 A1 * | 11/2003 | Burda | G11B 27/034 386/218 |
| 2003/0223466 A1 * | 12/2003 | Noronha et al. | 370/537 |
| 2003/0235391 A1 * | 12/2003 | Gates | H04N 5/76 386/295 |
| 2004/0033053 A1 * | 2/2004 | Chen et al. | 386/83 |
| 2004/0042103 A1 * | 3/2004 | Mayer | G11B 15/026 360/7 |
| 2004/0047589 A1 * | 3/2004 | Kim | 386/46 |
| 2007/0130597 A1 * | 6/2007 | Parker | H04H 20/38 725/94 |
| 2007/0162568 A1 * | 7/2007 | Gupta et al. | 709/219 |
| 2007/0162944 A1 * | 7/2007 | Khare et al. | 725/113 |
| 2007/0166005 A1 * | 7/2007 | Berstis et al. | 386/95 |
| 2008/0059533 A1 * | 3/2008 | Krikorian | 707/104.1 |
| 2008/0201751 A1 * | 8/2008 | Ahmed et al. | 725/109 |
| 2008/0313680 A1 * | 12/2008 | Suzanne et al. | 725/87 |
| 2009/0055549 A1 * | 2/2009 | Niwa et al. | 709/231 |
| 2009/0129747 A1 * | 5/2009 | Casagrande | 386/95 |
| 2009/0154890 A1 * | 6/2009 | Nakamura et al. | 386/46 |
| 2011/0083144 A1 * | 4/2011 | Bocharov et al. | 725/32 |
| 2011/0286715 A1 * | 11/2011 | Zhang et al. | 386/230 |
| 2012/0174166 A1 * | 7/2012 | Saraf et al. | 725/82 |
| 2013/0086615 A1 * | 4/2013 | Williams | H04N 21/41407 725/62 |
| 2013/0242189 A1 * | 9/2013 | Babu et al. | 348/468 |
| 2014/0032537 A1 * | 1/2014 | Shekhawat | 707/723 |
| 2014/0229970 A1 * | 8/2014 | Besehanic | 725/20 |

* cited by examiner

METHOD AND APPARATUS FOR VIEWING INSTANT REPLAY

FIELD OF INVENTION

The invention generally relates to viewing content, and more particularly relates to viewing content in a streaming media environment.

BACKGROUND

Consumers have an increasing amount of on-demand media content available to them. For example, on-demand media content includes visual content (e.g., movies, television shows, still images), audio content (e.g., music), and software applications (e.g., games).

With the increasing amount of on-demand content available, it becomes more challenging for consumer to find and view content of interest.

SUMMARY

A system includes a client device configured to detect an initial play request for a portion of a video stream and detect a subsequent play request for the portion of the video stream. A content server coupled to the client device is configured to transmit the portion of the video stream to the client device based upon the initial play request. A closed captioning information server coupled to the client device is configured to transmit the closed captioning information to the client device based on the initial play request. The client device is configured to display the portion of the video stream and the closed captioning information based upon the subsequent play request.

BRIEF DESCRIPTION OF THE DRAWINGS

The following figures depict various embodiments for illustrative purposes. From the figures and corresponding description, different embodiments may be employed without departing from the invention as described herein.

DETAILED DESCRIPTION

Figure 1:
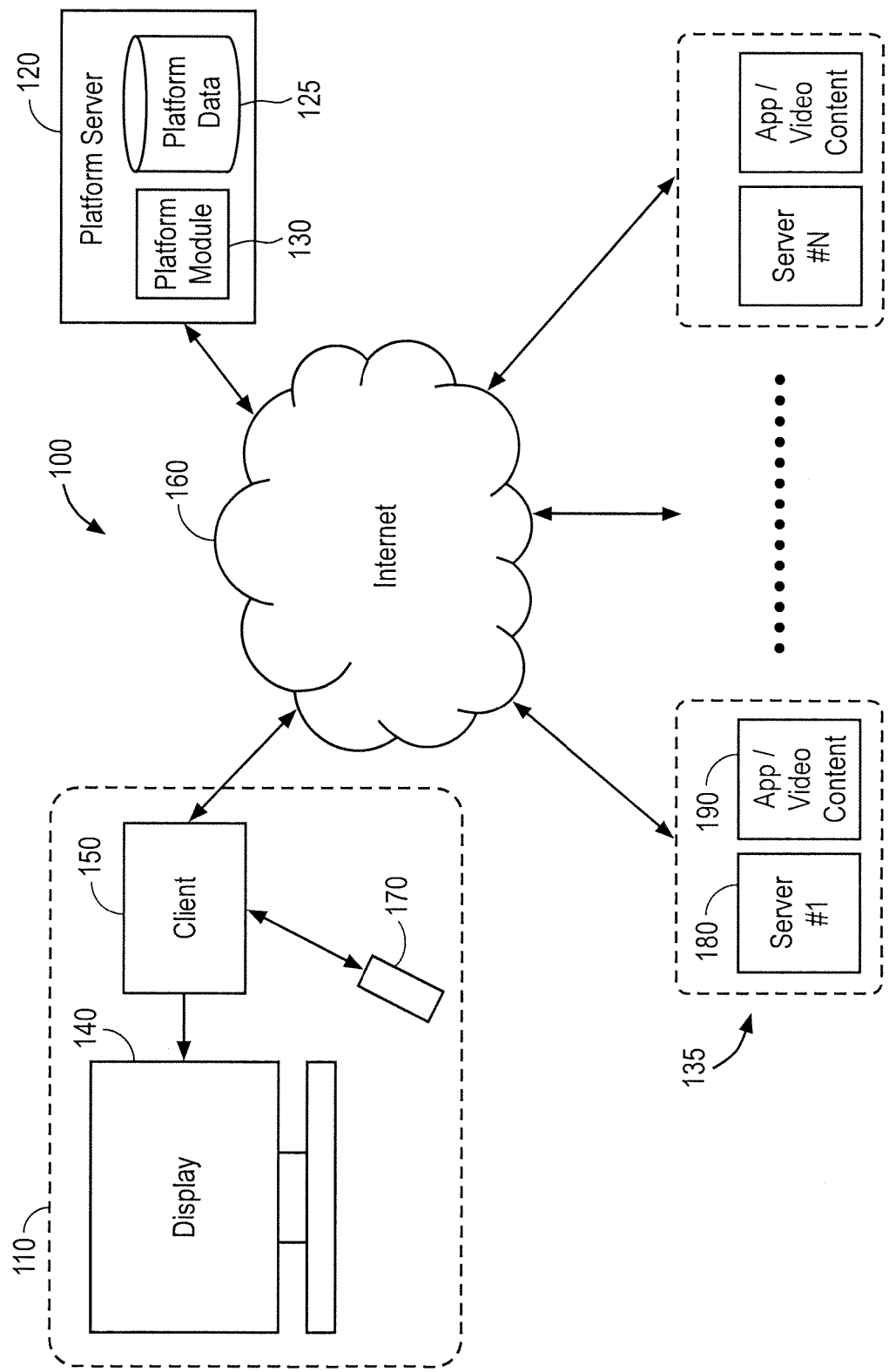
FIG. 1 illustrates a system configured in accordance with an embodiment of the invention.

FIG. 1 illustrates a streaming environment 100. The streaming environment 100 includes an interface system 110, a platform server 120 and one or more sources of content programming 135. In one embodiment, the interface system 110 includes a display device 140 (e.g., monitor or television), a client device 150 (e.g., a streaming media player) and a user input device 170 (e.g., a remote control). The client device 150 is configured to communicate with the display device 140 and a network 160.

In one embodiment, the platform server 120 includes a database 125 of platform data and a platform module 130. The database 125 is configured to store data such as programming software packages. The data within these programming software packages include the network locations and content descriptions of content sources 135, hardware/software capabilities of different firmware versions and specifications of the client device 150, customer data associated with each client device 150 and user interface information associated with the client device 150.

In one embodiment, the customer data includes customer specific information such as demographic data, geographic data, ISP identification and financial information. In one embodiment, the platform server 120 generates customized user interfaces for each of the client devices 150. In one embodiment, the user interface from the platform server 120 provides a selection of content such as audio, visual and gaming content to the client device 150. In this example, the platform server 120 is configured to supply a graphical representation of available content to the client device 150. The client device 150 selects and accesses individual content through this graphical representation.

In one embodiment, the platform server 120 is configured to receive input from client device 150 and processes the input through the platform module 130. The input from the client device 150 includes navigation and selection commands which may represent selection of content, search for content and ongoing interaction with an application running on the platform server 120.

In one embodiment, the client device 150 displays content on display device 140. In one embodiment, the content displayed on the display device is sourced from one of the client device 150, the platform server 120 and the content source 135. In one embodiment, the input device 170 transmits signals to the client device 150. In one embodiment, the input device 170 utilizes one of or a combination of an infrared signal, radio frequency signal and Bluetooth signal to communicate with the client device 150.

The input device 170 is configured to enter data and to make user selections from the interface as presented through the client device 150. In one embodiment, the interface supplied by the client device 150 is based on the platform server 120, from the content sources 135 or locally from the client device 150. In one embodiment, the input device 170 also includes a display to show additional content. In another embodiment, the input device 170 includes a touch screen which allows content to be displayed and input to be received. Exemplary input devices 170 include dedicated remote controls, smart phones, tablets, and mobile computers.

In one embodiment, the content sources 135 include a server 180 and a storage device 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications and the like. In one embodiment, the particular content which is stored within the storage device 190 is provided to the client device 150 through the network 160. In one embodiment, the network 160 is the Internet. In another embodiment, the network 160 is a local area network. In yet another embodiment, the network 160 is a satellite based network or a terrestrial network.

In one embodiment, the client device 150 makes a request for specific content. If the requested content is video content, the storage device 190 transmits video data that represents the specific video content to the client device 150 through the content source 135. In one embodiment, platform server 120 supports interfaces, such as login interfaces, search interfaces and customized interfaces for the client device 150.

Figure 2:
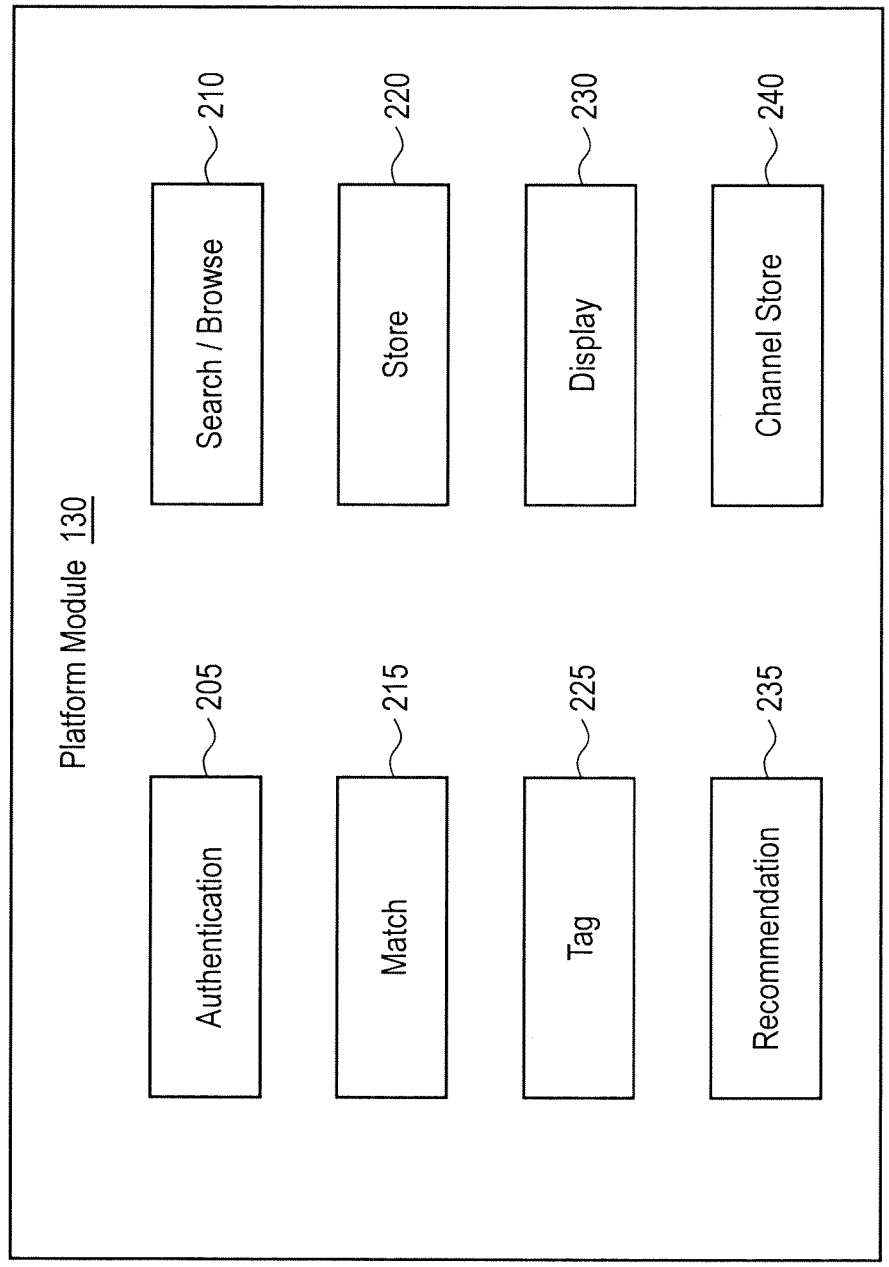
FIG. 2 illustrates server modules utilized in accordance with an embodiment of the invention.

FIG. 2 illustrates a representative platform module 130. In one embodiment, the platform module 130 includes an authentication module 205, a search/browse module 210, a match module 215, a store module 220, a tag module 225, a display module 230, a recommendation module 235 and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information and content subscriptions. In one embodiment, the authentication module 205 recognizes and authenticates the client device associated with a particular user account through password authentication, location authentication, visual authentication or audio authentication. The authentication can be configured to occur when setting up a new client device 150, purchasing content or subscriptions or periodically as needed.

The search/browse module 210 is configured to detect input from a client device 150 and/or the input device 170. In one embodiment, the input represents the selection of a channel, content or application. In another embodiment, the input represents a textual, visual or audible search for content, a channel or application. In yet another embodiment, the input represents browsing content, channels or applications.

The match module 215 coordinates searches and requests for content, channels and applications. For example, the match module 215 identifies relevant content, channels and applications based upon the search criteria. In one embodiment, the match module 215 relies on titles, tags, description and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, tags and friends. Depending on the nature of the data, access to the content is controlled to prevent unauthorized use.

The tag module 225 coordinates the creation and use of tags associated with content, channels and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and searched by the user creating the tags or the tags can be aggregated among multiple users and searched through a public database.

The display module 230 coordinates display of representative content and user interfaces from the platform server 120 to each of the client devices 150. Examples of representative content include listings and descriptions of channels, content and applications. The user interface is configured to allow searching and browsing for channels, contents and applications.

The recommendation module 235 is configured to process content recommendations based on a combination of current subscriptions, browsing or searching input and content source. Further, the recommendation module 235 also can utilize tags to provide recommendations. In another embodiment, the recommendation module 235 utilizes the availability of the content to provide a recommendation. For example, a viewing window which describes when the content is available for viewing describes a beginning and end date for the availability of the content. Further, the recommendation module 235 can also utilize the subscription data associated with each user account to determine whether the content is available to the user without additional charge because the account user is already subscribed to the content provider. Further, the recommendation module 235 can also prioritize content that is available free of charge without any subscriptions. In another embodiment, the recommendation module 235 can prioritize content based on popularity ratings as illustrated under the public viewing data 335.

The channel store module 240 is configured to manage subscriptions of channels associated with each client device 150. Channels often contain content such as video content and audio content. In one embodiment, access to the content within a channel requires a subscription to that channel, but the subscription is free. In another embodiment, access to the content within a channel requires a paid subscription. In yet another embodiment, access to some content and applications require payment and a subscription. In one embodiment, the channel store module 240 manages the addition of channels, content and applications. Similarly, the channel store module 240 also manages deletion or modifications to channels, content and applications.

Figure 3:
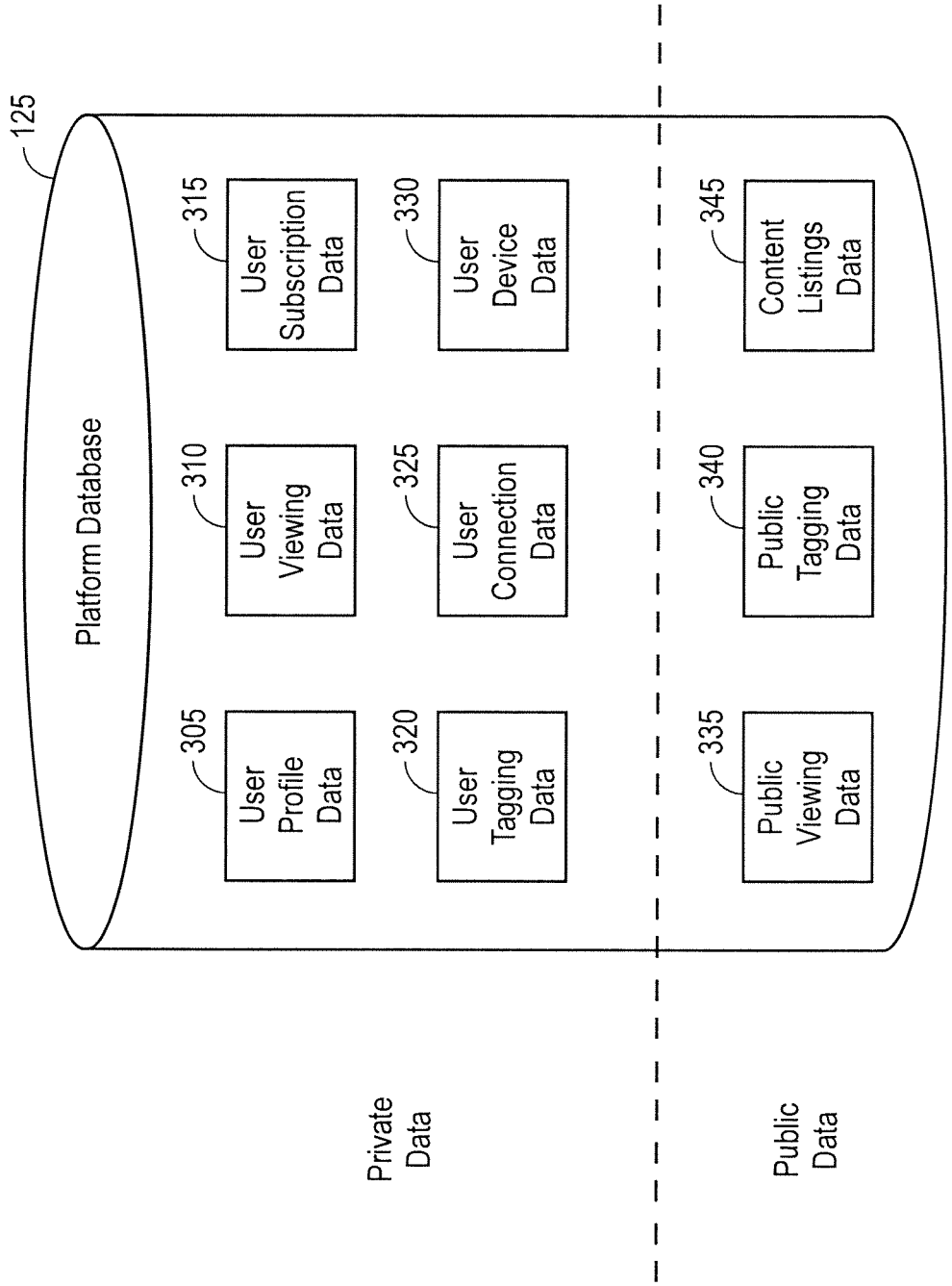
FIG. 3 illustrates server data utilized in accordance with an embodiment of the invention.

FIG. 3 illustrates a representative platform database 125 as shown in FIG. 1. In one embodiment, the platform database 125 includes private data and public data. The private data contains information which is associated with a particular user; the public data contains information that is aggregated and not associated with a particular user. The private data within the platform database 125 includes user profile data 305, user viewing data 310, user subscription data 315, user tagging data 320, user connection data 325 and user device data 330. The public data within the platform database 125 includes public viewing data 335, public tagging data 340 and content listing data 345.

In one embodiment, utilization of the private data is restricted to access within the platform server 120 and access by the particular user to his or her own private data. Utilization of the public data can be accessed by all users and selected third parties.

The user profile data 305 includes information such as a user's name, address, credit card/payment information, age and gender. The user viewing data 310 includes the channels, audio content, visual content, video content and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based or voice based search. In another embodiment, the stored searches are implicitly identified by recording browsing choices.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags and applications with other connected users. The user device data 330 includes a listing of devices associated with the particular user. The device includes a client device 150, an input device 170, and a mobile device such as a tablet, laptop computer or smart phone.

The public viewing data 335 includes a listing of channels, content, and applications utilized by many users in aggregate. In one embodiment, the popularity of the content is ranked based on the number of viewers and the order in which the content is viewed. For example, the higher number of views per day for content would indicate higher popularity. Further, when multiple content selections are presented next to each other, the content which is selected first for viewing is given a higher popularity rating.

The public tagging data 340 includes tags that are utilized to describe channels, content and applications from many users in aggregate. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content and third party reviews associated with the content.

Figure 4:
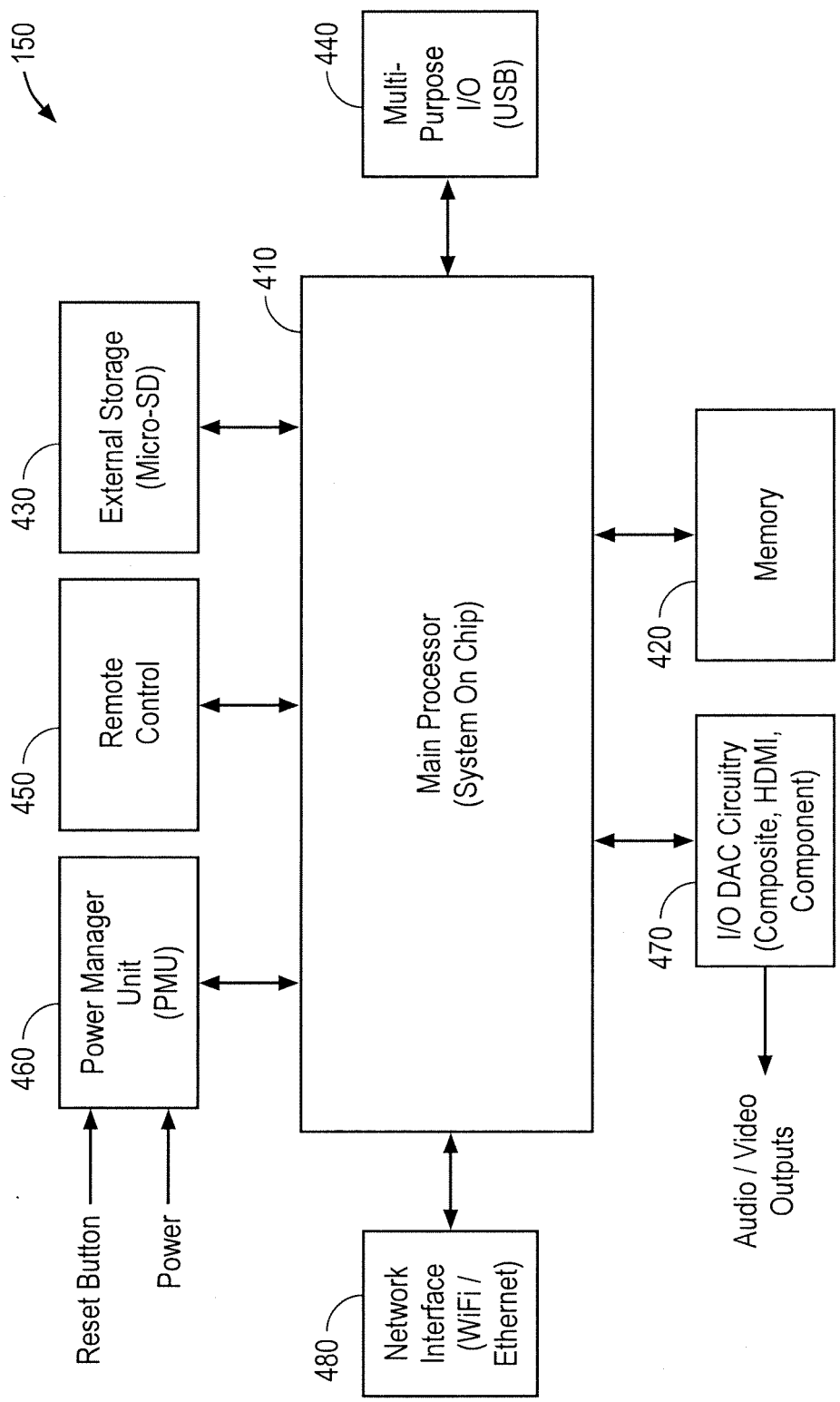
FIG. 4 illustrates a streaming media client device configured in accordance with an embodiment of the invention.

FIG. 4 illustrates a block diagram of a representative client device 150 as shown in FIG. 1. In one embodiment, the client device 150 is configured to receive streamed content. The content streamed into the client device 150 includes audio content, visual content and applications. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470 and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory and read only memory (ROM). Additional memory and memory interfaces such as the multi-purpose I/O port 440 may be provided in various embodiments, to support memories such as the external storage 430 which can include hard disks, USB drives, SD cards, and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through a input device including any combination of virtual buttons embodied on a customization screen, physical buttons, accelerometer, gyroscope, pressure sensor, tilt sensor, magnetic sensor, microphone and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL) and composite video. In one embodiment, USB and Apple® Thunderbolt® enabled displays are also supported.

In one embodiment, the network interface 480 supports multiple network interfaces such as Ethernet, Wi-Fi and Bluetooth. In another embodiment, the network interface 480 also supports coaxial, digital TV antenna and satellite television.

Figure 5:
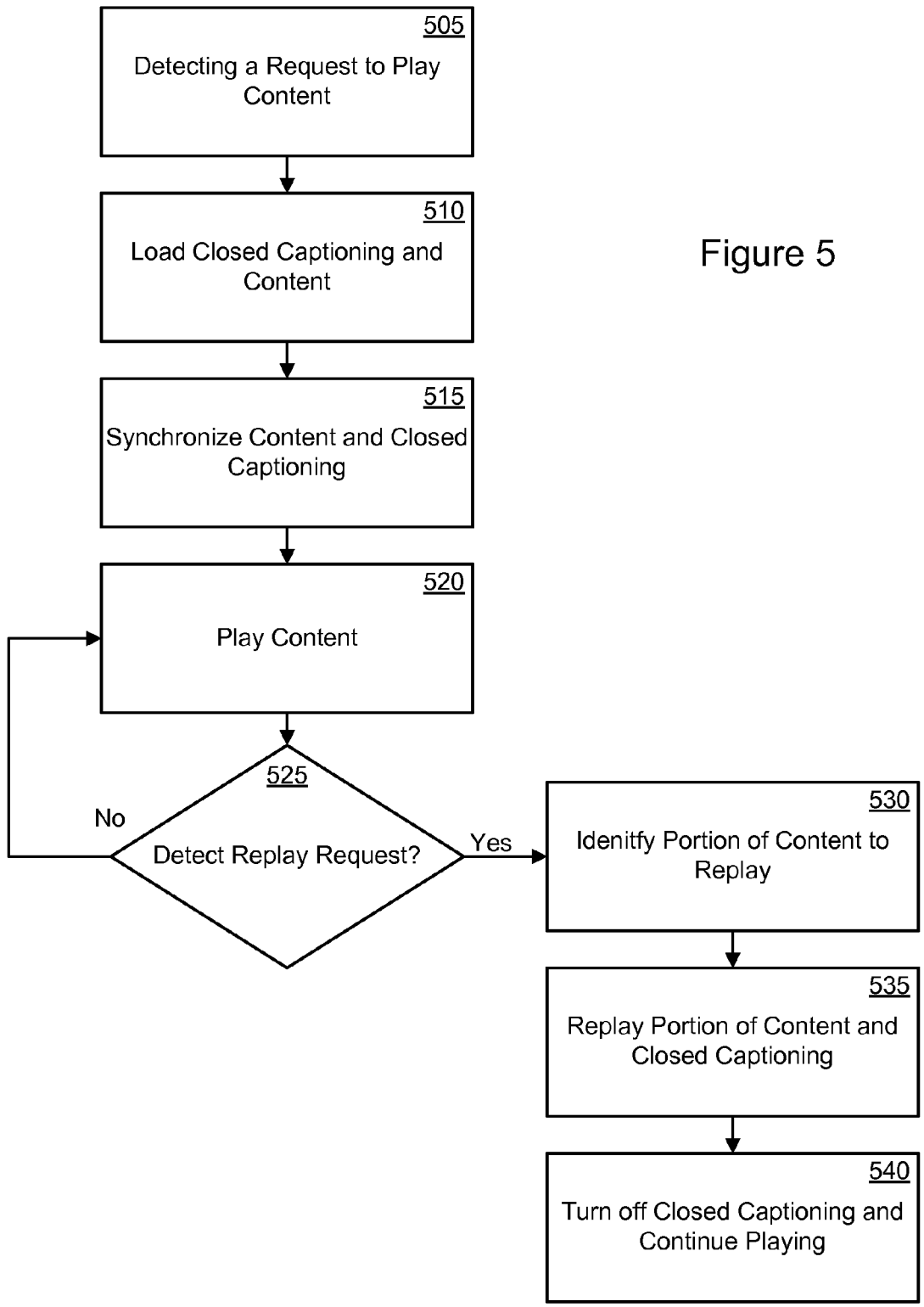
FIG. 5 illustrates processing operations associated with an embodiment of the invention.
Figure 6:
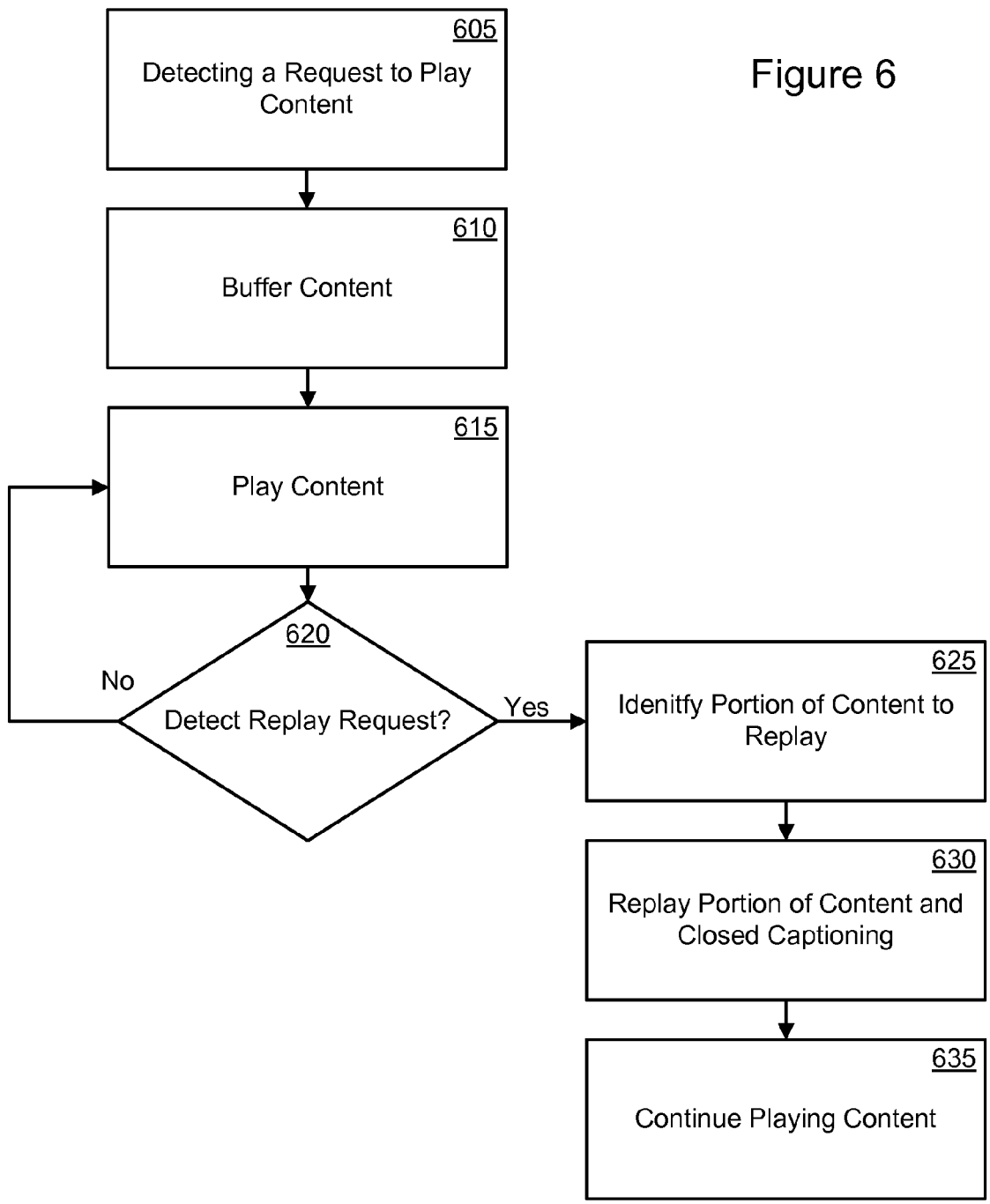
FIG. 6 illustrates processing operations associated with another embodiment of the invention.

FIGS. 5 and 6 illustrate flow diagrams showing exemplary embodiments for use with the streaming environment 110 and the platform server 120. The blocks within the flow diagrams are shown only for illustrative purposes. For example, blocks within the flow diagram can be further divided, combined or performed in a different order without limiting the scope of the claims.

FIG. 5 illustrates a request to replay content through a client device 150 or input device 170 while leveraging the platform server 120 to coordinate the display of closed captioning content with the video content.

In Block 505, an initial request to play content is detected. In one embodiment, the input device 170 instructs the client device 150 to begin displaying streaming video content. In one instance, the input device 170 is a dedicated remote control. In another instance, the input device 170 is a smart phone or tablet device configured to control the client device 150.

In Block 510, a portion of the streaming video content and corresponding closed captioning content is loaded onto the client device 150. In one embodiment, the client device 150 buffers the streaming video content and the closed captioning content. In another embodiment, the client device 150 loads the entire closed captioning content for the streaming video content.

In Block 515, the streaming video content and the corresponding closed captioning content are synchronized. In one embodiment, the streaming video content and the closed captioning content are synchronized to a common clock.

In Block 520, the streaming video content is displayed through the client device 150. In one embodiment, the streaming video content is displayed on an A/V device such as a television or a monitor with a sound system.

In Block 525, detection for a replay request is monitored. In one embodiment, the replay request is detected while the streaming video content is being played. Further, the replay request is performed through the input device 170 in one embodiment.

In Block 530, a replay request from the Block 525 is detected and a portion of the streaming video content is identified to be replayed through the client device 150. In one embodiment, determining the portion of the content to be replayed is based on the timing of the replay request in conjunction with the streaming video content being played. In use, a pre-determined time duration of content prior to the replay request will be replayed. For example, a 30 second block of content is selected to be replayed prior to receiving the replay request.

In Block 535, the portion of the content is replayed simultaneously with the closed captioning content through the client device 150. For example, the portion of the content is replayed based on the replay request detected within the Block 525. While the portion of the content is being replayed, closed captioning which corresponds to the portion of the replayed content is also displayed with the content being replayed.

In Block 540, the replay of the streaming video content terminates and the closed captioning is no longer displayed. Instead, the streaming video content continues to play through the client device 150.

FIG. 6 illustrates a request to replay content through a client device 150 or input device 170 while leveraging the platform server 120 to coordinate the display of closed captioning content with the video content.

In Block 605, an initial request to play content is detected. In one embodiment, the input device 170 instructs the client device 150 to begin displaying streaming video content. In one instance, the input device 170 is a dedicated remote control. In another instance, the input device 170 is a smart phone or tablet device configured to control the client device 150.

In Block 610, a portion of the streaming video content and corresponding closed captioning content is buffered through the client device 150. In one embodiment, the client device 150 buffers the streaming video content and the closed captioning content. In one embodiment, the closed captioning content and the streaming video content are buffered through the client device 150 simultaneously.

In Block 615, the streaming video content is displayed through the client device 150. In one embodiment, the streaming video content is displayed on an A/V device such as a television or a monitor with a sound system.

In Block 620, detection for a replay request is monitored. In one embodiment, the replay request is detected while the streaming video content is being played. Further, the replay request is performed through the input device 170 in one embodiment.

In Block 625, a replay request from the Block 620 is detected and a portion of the streaming video content is identified to be replayed through the client device 150. In one embodiment, determining the portion of the content to be replayed is based on the timing of the replay request in conjunction with the streaming video content being played. In use, a pre-determined time duration of content prior to the replay request will be replayed. For example, a 30 second block of content is selected to be replayed prior to receiving the replay request.

In Block 630, the portion of the content is replayed simultaneously with the closed captioning content through the client device 150. For example, the portion of the content is replayed based on the replay request detected within the Block 620. While the portion of the content is being replayed, closed captioning which corresponds to the portion of the replayed content is also displayed with the content being replayed.

In Block 635, the replay of the streaming video content terminates and the closed captioning is no longer displayed. Instead, the streaming video content continues to play through the client device 150.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method, comprising:
receiving, from a content server, streamed internet content at a client device for presentation on a display, wherein the client device is a streaming media player;
receiving public tag information and private tag information from an information server, wherein the public tag information includes closed captioning content corresponding to at least a portion of the streamed internet content at the client device, wherein the streamed internet content and the corresponding closed captioning content are different streams of data that are simultaneously buffered at the client device, and wherein the private tag information includes comments of a first user, that are only viewable by designated second users;
initially playing a portion of a video stream through the client device including the corresponding private tag information and without the corresponding closed captioning information, wherein the closed captioning information corresponds to the portion of the video stream and is stored in a buffer of the client device for a pre-determined time duration;

receiving a request to replay the portion of the video stream through the client device after initially playing the portion of the video stream through the client device without the closed captioning information;

retrieving the closed captioning information from the buffer based on the request;

synchronizing the portion of the video stream to be replayed with a corresponding portion of the closed captioning information based on a common clock; and displaying the closed captioning information through the client device based on the request while simultaneously replaying the portion of the video stream, wherein upon completion of the replaying of the portion of the video stream, the closed captioning information is no longer displayed while the video stream continues to play.

2. The method according to claim 1, wherein the closed captioning information and the portion of the video stream are stored together in the buffer.

3. The method of claim 1, wherein the information server is different from the content server.

4. The method of claim 1, wherein the streamed internet content is received via a first transmission, and the closed captioning content is received via a second transmission.

5. The method of claim 1, wherein displaying comprises displaying the closed captioning information through the client device based on the request while simultaneously replaying the portion of the video stream for the pre-determined time duration.

6. The method of claim 1, wherein the second user is logged into the client device, and wherein the first user is associated with the second user through a network.

7. The method of claim 6, wherein the private tag information associated with the first user is only available for viewing with the streamed internet content by the second user if the first user and the second user are associated on the network as being connected to one another, and wherein the public tag information is available for viewing by both the first and second users independent of their association with one another on the network.

8. The method of claim 7, wherein the public tag information includes comments from a content provider of the streamed internet content.

9. The method of claim 1, wherein the streamed internet content and the corresponding closed captioning content are different streams of data that are simultaneously received and simultaneously buffered.

10. The method of claim 1, wherein the second user is logged into the client device, and wherein the private tag information includes one or more comments provided by the second user.

11. The method of claim 1, wherein the private tag information includes a plurality of comments uploaded by a plurality of users regarding a channel associated with the streamed internet content.

12. The method of claim 1, wherein the initially playing the portion of the streamed internet content comprises:

playing the portion of the streamed internet content prior to receiving a subsequent remaining portion of the streamed internet content, and wherein the closed captioning corresponding to both the initially played portion and the subsequent remaining portion was received and buffered prior to the initially playing.

13. A method, comprising:

receiving, from a content server, streamed internet content at a client device for presentation on a display, wherein the client device is a streaming media player;

receiving public tag information and private tag information from an information server, wherein the public tag information includes closed captioning content corresponding to at least a portion of the streamed internet content at the client device, wherein the streamed internet content and the corresponding closed captioning content are different streams of data that are simultaneously buffered at the client device, and wherein the private tag information includes comments of a first user, that are only viewable by designated second users;

initially playing a portion of a video stream through the client device including the corresponding private tag information and without the corresponding closed captioning information, wherein the closed captioning information corresponds to the portion of the video stream and is stored in a buffer of the client device for a pre-determined time duration;

receiving a request to replay the portion of the video stream through the client device after initially playing the portion of the video stream through the client device without the closed captioning information;

receiving streamed internet content for the portion of the video stream at the client device, wherein the streamed internet content for the portion of the video stream includes closed captioning information retrieved from the content source in response to the request to replay;

synchronizing the portion of the video stream to be replayed with a corresponding portion of the closed captioning information based on a common clock;

replaying the portion of the video stream through the client device based on the request; and displaying the closed captioning information through the client device based on the request while simultaneously replaying the portion of the video stream, wherein upon completion of the replaying of the portion of the video stream, the closed captioning information is no longer displayed while the video stream continues to play.

14. A tangible computer-readable device having instructions stored thereon that, when executed by at least one computing device, causes the at least one computing device to perform operations comprising:

receiving, from a content server, streamed internet content at a client device for presentation on a display, wherein the client device is a streaming media player;

receiving public tag information and private tag information from an information server, wherein the public tag information includes closed captioning content corresponding to at least a portion of the streamed internet content at the client device, wherein the streamed internet content and the corresponding closed captioning content are different streams of data that are simultaneously buffered at the client device, and wherein the private tag information includes comments of a first user, that are only viewable by designated second users;

initially playing a portion of a video stream through the client device including the corresponding private tag information and without the corresponding closed captioning information, wherein the closed captioning information corresponds to the portion of the video stream and is stored in a buffer of the client device for a pre-determined time duration;

receiving a request to replay the portion of the video stream through the client device after initially playing the portion of the video stream through the client device without the closed captioning information;

retrieving the closed captioning information from the buffer based on the request;

synchronizing the portion of the video stream to be replayed with a corresponding portion of the closed captioning information based on a common clock; and displaying the closed captioning information through the client device based on the request while simultaneously replaying the portion of the video stream, wherein upon completion of the replaying of the portion of the video stream, the closed captioning information is no longer displayed while the video stream continues to play.

* * * * *